(12) United States Patent
Doy et al.

(10) Patent No.: US 12,142,087 B2
(45) Date of Patent: Nov. 12, 2024

(54) SYSTEM AND METHOD FOR GENERATING A MULTI-LAYER MATERIAL PROPERTY MAP

(71) Applicant: Caterpillar Paving Products Inc., Brooklyn Park, MN (US)

(72) Inventors: Nathaniel S. Doy, Maple Grove, MN (US); Joseph L. Faivre, Edelstein, IL (US); Jeremy Wayne Lee, Otsego, MN (US); John L. Marsolek, Watertown, MN (US); Matthew Thomas Hanson, St Louis Park, MN (US); Brian D. Nagel, Ramsey, MN (US); Robert K. Iverson, Maple Grover, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 268 days.

(21) Appl. No.: 17/725,652

(22) Filed: Apr. 21, 2022

(65) Prior Publication Data
US 2023/0343144 A1    Oct. 26, 2023

(51) Int. Cl.
*G07C 3/02* (2006.01)
*E01C 19/48* (2006.01)
(Continued)

(52) U.S. Cl.
CPC ........... *G07C 3/02* (2013.01); *G01C 21/3841* (2020.08); *G01C 21/3867* (2020.08); *G06F 3/04815* (2013.01); *G06F 3/04817* (2013.01); *G06F 3/0482* (2013.01); *G06F 3/0484* (2013.01); *G06T 17/05* (2013.01); *E01C 19/48* (2013.01);
(Continued)

(58) Field of Classification Search
CPC .. G07C 3/02; G01C 21/3841; G01C 21/3867; G06F 3/04815; G06F 3/04817; G06F 3/0482; G06F 3/0484; G06F 2203/04803; G06T 17/05; G06T 2200/24; E01C 19/48
See application file for complete search history.

(56) References Cited

U.S. PATENT DOCUMENTS

| | | |
|---|---|---|
| 7,908,062 B2 | 3/2011 | Corcoran |
| 9,086,698 B2 | 7/2015 | Faivre et al. |
| | (Continued) | |

*Primary Examiner* — Michael D Lang

(57) ABSTRACT

A system and method include receiving sensor data from a of at least a portion of a work surface of a worksite including a first one or more material properties, a first timestamp, a first location, and the like, determining a multi-layer map based at least in part from this data and including new layer commands, meeting or exceeding data thresholds, new machine operations, machine learning models, and receiving additional sensor data containing a second same, similar, and/or different information, generating a new layer and/or overwriting the existing layer data, and providing a processed map to one or more machines, memory, additional devices, and the like. The method also includes saving prior layers and/or data of overwritten layers. The method further includes causing at least a part of the multi-layer material property map to be displayed. The displayed at least part of the multi-material property map including visual indicia indicating the first one or more material properties, the first timestamp, the first location, a first layer, etc. and one or more of a subsequent timestamp, the first location, a subsequent layer, and the like.

17 Claims, 5 Drawing Sheets

(51) Int. Cl.
   *G01C 21/00*      (2006.01)
   *G06F 3/04815*    (2022.01)
   *G06F 3/04817*    (2022.01)
   *G06F 3/0482*     (2013.01)
   *G06F 3/0484*     (2022.01)
   *G06T 17/05*      (2011.01)

(52) U.S. Cl.
   CPC .............. *G06F 2203/04803* (2013.01); *G06T 2200/24* (2013.01)

(56) References Cited

U.S. PATENT DOCUMENTS

| | | |
|---|---|---|
| 10,018,611 B2 | 7/2018 | Stromsoe |
| 10,315,655 B2 | 6/2019 | Blank et al. |
| 10,829,901 B2 | 11/2020 | Wisley et al. |
| 2007/0239338 A1 | 10/2007 | Potts et al. |
| 2018/0257657 A1* | 9/2018 | Blank ................. G05D 1/0219 |
| 2020/0325647 A1 | 10/2020 | Nichols |

\* cited by examiner

SYSTEM AND METHOD FOR GENERATING A MULTI-LAYER MATERIAL PROPERTY MAP

TECHNICAL FIELD

The present disclosure relates to generating a multi-layer material property map. More specifically, the present disclosure relates to generating a material property map containing information indicative of multiple material properties, gathered at different times and/or locations, at a worksite.

BACKGROUND

Worksite material maps provide an illustration of at least a portion of a work surface of the worksite, and often indicate associated characteristics of at least a portion of the work surface. Such material maps may be generated based on, and in some cases, indicate discrete sensor data associated with location, material type, elevation, and other properties of the work surface. Such example worksite material maps are typically two-dimensional ("2D") maps including coordinates associated with the worksite, topographical information, and occasionally, some additional information indicating the type or composition of the material making up the work surface.

Although such worksite maps can be useful in various paving, construction, mining, farming, and other applications, such maps do not dynamically reflect changes in the material properties and/or conditions of the worksite over time. For example, in some paving applications, different sections of a paving material mat often have significantly different respective temperatures and densities due to variations in delivery schedules, ambient conditions, paving machine settings, prior compaction operations, and other factors. Such differences in the properties of the paving material mat can affect the manner in which the respective sections of the paving material mat are compacted or further processed. However, since known worksite maps generally do not provide such information, most operations in the paving process rely heavily on the training, skill, and experience of paving equipment operators.

An example system for providing soil compaction information is described in U.S. Pat. No. 10,018,611 (hereinafter referred to as the '611 reference). In particular, the '611 reference describes a compactor including a measuring arrangement configured to obtain an indication as to the depth to which a drum penetrates into and depresses a soil work surface. The system described in the '611 reference correlates these depth measurements with corresponding location information and provides an indication of "soil strength" at various portions of the work surface that can be used for various further operations.

The system described in the '611 reference is not however, configured to provide information indicating material properties associated with various different layers of the work surface. The system described in the '611 reference is also not configured to dynamically update such information, in real time, or to make such information available to multiple machines, foremen, or other worksite personnel in an easily accessible manner. As a result, the system described in the '611 reference is not configured to maximize efficiency of the various processes being performed by the fleet of machines being utilized at the worksite.

Examples of the present disclosure are directed toward overcoming the deficiencies described above.

SUMMARY

In an aspect of the present disclosure, a method includes receiving first information, by a first processor and via a network, determined by a sensor disposed at a worksite, the first information including a first timestamp, an indication of a first location at the worksite, and an indication of a first characteristic of material disposed at the first location. Additionally, the method includes receiving second information, by the first processor and via the network, the second information including a second timestamp different from the first timestamp, an indication of the first location, and an indication of a second characteristic of material disposed at the first location. The method further includes generating, by the first processor, a multi-layer map of the worksite based on the first information and the second information and providing, by the first processor and via the network, instructions to a second processor disposed at the worksite wherein when executed by the second processor, the instructions cause the second processor to provide an interactive user interface via a display operably connected to the second processor, the user interface illustrating a portion of the map representing the first location, and including at least one of the first information or the second information.

In another aspect of the present disclosure, a system includes a first processor, a sensor disposed at a worksite and in communication with the first processor, and a memory operably connected to the first processor. The system also includes storing first instructions which, when executed by the first processor, cause the first processor to receive first information, via a network, determined by the sensor, the first information including a first timestamp, an indication of a first location at the worksite, and an indication of a first characteristic of material disposed at the first location. The system further includes receiving second information, determined by the sensor and via the network, the second information including a second timestamp different from the first timestamp, the indication of the first location, and an indication of a second characteristic of material disposed at the first location. The system also includes generating a multi-layer map of the worksite based on the first information and the second information and providing, via the network, second instructions to a second processor disposed at the worksite, wherein when executed by the second processor, the second instructions cause the second processor to provide an interactive user interface via a display operably connected to the second processor. The user interface is also configured to illustrate a portion of the map representative of the first location and including at least one of the first information or the second information.

In yet another aspect of the present disclosure, a machine system includes a first machine including, a frame, a prime mover supported by the frame, an implement operably connected to the frame, and moveable relative to the frame to perform at least one operation on a work surface of a worksite at which the machine is disposed. The prime mover is further configured to drive the machine along the work surface. Additionally, the machine includes a first processor, a sensor carried by the frame and operably connected to the first processor, and a memory operably connected to the first processor, the memory storing first instructions which, when executed by the first processor, cause the first processor to receive first information, via a network, determined by the sensor, the first information including a first timestamp, an indication of a first location at the worksite, and an indication of a first characteristic of material disposed at the first location. The first processor further receives second information, determined by the sensor and via the network, the second information including a second timestamp different from the first timestamp, the indication of the first location, and an indication of a second characteristic of material disposed at the first location. The processor also generates a multi-layer map of the worksite based on the first information and the second information and provides, via the network, second instructions to a second processor disposed at the worksite, wherein when executed by the second processor, the second instructions cause the second processor to provide an interactive user interface via a display operably connected to the second processor, the user interface configured to illustrate a portion of the map representative of the first location, and including at least one of the first information or the second information.

DETAILED DESCRIPTION

Wherever possible, the same reference numbers will be used throughout the drawings to refer to the same or like parts.

Figure 1:
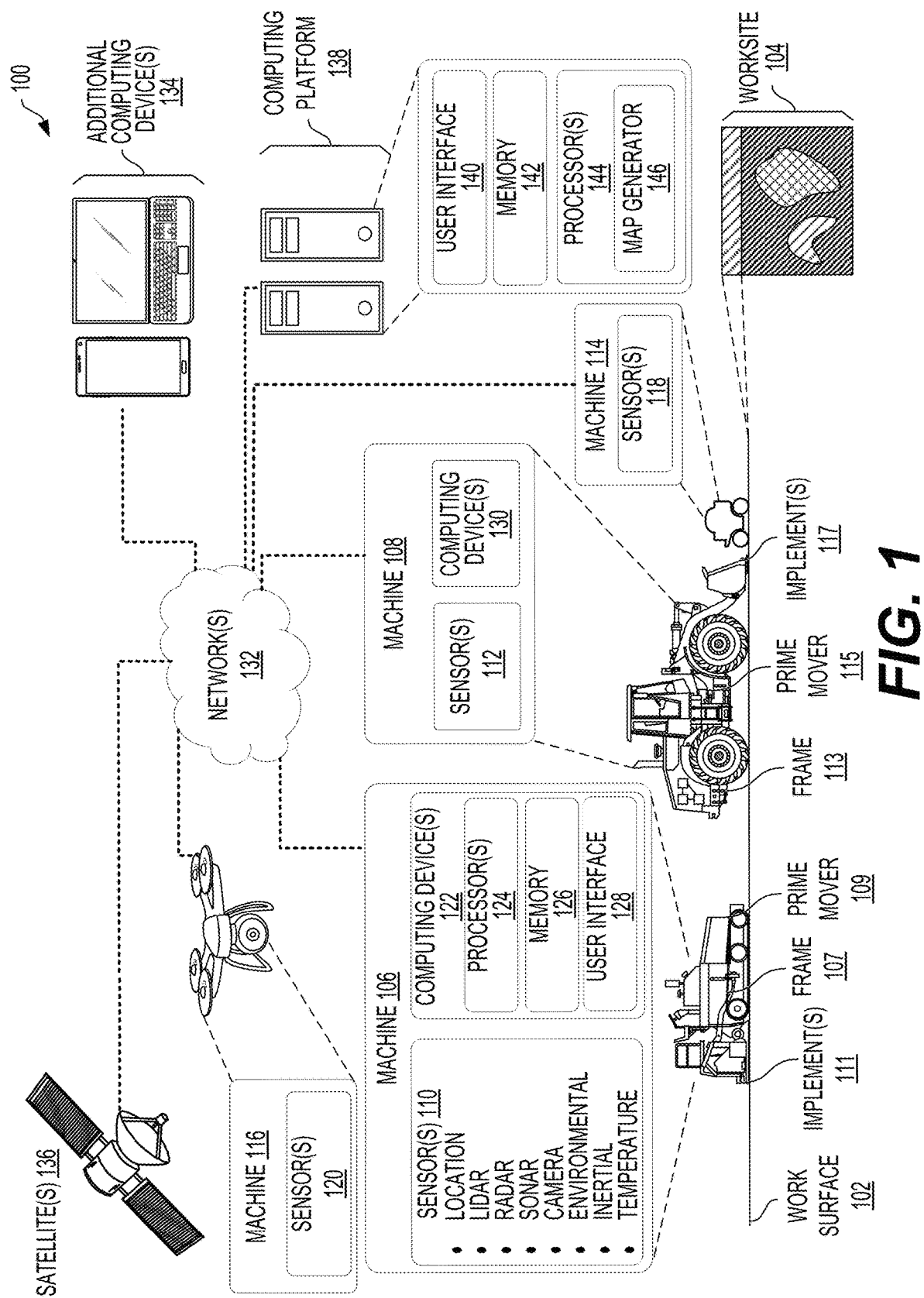
FIG. 1 illustrates an example system configured to generate a multi-layer material property map, in accordance with examples of this disclosure.

FIG. 1 illustrates an example system 100 configured to generate and provide a multi-layer material property map. As will be described below, in some examples, the material property map includes information associated with individual layers of material making up a work surface 102 of a worksite 104, and the material property map can be updated, in real-time, as operations are performed on the work surface 102.

As shown in FIG. 1, the example system 100 includes one or more machines disposed on and/or configured to perform one or more tasks on a work surface 102 of a worksite 104. For example, as illustrated in FIG. 1, the system 100 includes a first machine 106 disposed on the work surface 102. The first machine 106 is illustrated as a paving machine, but in additional examples, the first machine 106 may be a compaction machine, a haul truck, a dozer, an excavator, an articulated truck, a cold planer, a motor grader, a track loader, a wheel loader, or any other type of machine (e.g., paving equipment, mining equipment, construction equipment, etc.) configured to perform tasks at the worksite 104 or in other environments. The first machine 106 also includes a first frame 107, and a first prime mover 109 (e.g., an engine, one or more batteries, a fuel cell) supported by the first frame 107 and configured to provide power to machine components. The first machine 106 also includes one or more work tools or other first implement(s) 111 (e.g., screed, rotor, drum, bucket, etc.) operably connected to the first frame 107, movable relative to the first frame 107, and configured to perform one or more operations on the work surface 102. Such operations could be removing a portion of the work surface 102, depositing material (e.g., asphalt or other such paving material) onto the work surface 102, compacting the work surface 102 and/or material deposited on the work surface 102, moving gravel, sand, dirt, or other material located on the work surface 102 from a first location to a different second location, grading at least part of the work surface 102, etc. In some examples, the first machine 106 comprises a manned machine (e.g., operator manually controlling parameters and operation), but in other examples the first machine 106 comprises a semi-autonomous machine or a fully-autonomous machine. In further examples, the system 100 includes a second machine 108. The second machine 108 can be the same and/or a different machine as/than the first machine 106. Similarly, the second machine 108 also includes a second frame 113, and a second prime mover 115 (e.g., an engine, one or more batteries, a fuel cell) supported by the second frame 113 and configured to provide power to machine components. The second machine 108 also includes one or more work tools or other second implement(s) 117 (e.g., screed, rotor, drum, bucket, etc.) operably connected to the second frame 113, movable relative to the second frame 113, and configured to perform one or more operations on the work surface 102. Such operations could be removing a portion of the work surface 102, depositing material (e.g., asphalt or other such paving material) onto the work surface 102, compacting the work surface and/or material deposited on the work surface 102, moving gravel, sand, dirt, or other material located on the work surface 102 from a first location to a different, second location, grading at least part of the work surface 102, etc. Additionally, although the second machine 108 is illustrated in FIG. 1 as a wheel loader, in other examples, the second machine 108 may be a haul truck, a paver, a compactor, an excavator, an articulated truck, a cold planer, a motor grader, a track loader, a wheel loader, or any other type of machine (e.g., paving equipment, mining equipment, construction equipment, etc.) configured to perform tasks at the worksite 104 or in other environments. Additionally, the second machine 108 can comprise a manned machine, a semi-autonomous machine, and/or a fully-autonomous machine.

As shown in FIG. 1, the first machine 106 is equipped with one or more first sensor(s) 110, and the second machine 108 is also equipped with one or more second sensor(s) 112. As illustrated schematically in FIG. 1, one or more of the first sensors 110 is connected to and/or otherwise carried by the first machine 106, and one or more of the first sensors 110 are configured to capture information in an environment surrounding the first machine 106. Such example first sensors 110 include LIDAR sensors, RADAR sensors, SONAR sensors, cameras (e.g., RGB, IR, intensity, depth, time of flight, etc.), audio sensors, ultrasonic transducers, location sensors (e.g., global positioning system (GPS), elevation sensors, etc.), inertial sensors (e.g., inertial measurement units, accelerometers, magnetometers, gyroscopes, etc.), environment sensors (e.g., temperature sensors, humidity sensors, light sensors, pressure sensors, etc.), and the like. Additionally, in some examples one or more of the first sensors 110 is configured to capture material property data. In such examples, one or more of the sensor 110 comprises a soil sensor, a paving material sensor, or other like sensor configured to determine a composition of the work surface 102, a density of the work surface 102, a temperature of the work surface 102, a moisture level (e.g., water level or humidity) of the work surface 102, and/or other properties or characteristics of the work surface 102. As illustrated in FIG. 1, the one or more of second sensors 112 of the second machine 108 are configured to capture information in an environment surrounding the second machine 108. In such examples, the second sensors 112 include the same and/or different sensors as described above and included regarding the first sensors 110.

As shown in FIG. 1, an example system 100 may also include one or more ground-based mobile machines (e.g., a rover) 114 and/or one or more aerial machines (e.g., a drone) 116. The mobile machine 114 comprises any on-road or off-road vehicle configured to controllably traverse a portion of the work surface 102 of the worksite 104 ahead of and/or following the first machine 106 and/or the second machine 108. For example, the mobile machine 114 comprises an all-terrain vehicle, rover, or other like machine configured to make multiple passes along the work surface 102 and in accordance with a desired travel path. Additionally, the mobile machine 114 carries one or more third sensor(s) 118. The third sensors 118 can be the same as and/or different from the first sensors 110 of the first machine 106. The mobile machine 114 can traverse the worksite 104 prior to a machine operation conducted by the first machine 106. In further examples, the mobile machine 114 can traverse the worksite 104 following the machine operation conducted by the first machine 106. In such examples, the mobile machine 114 can, in close timing proximity, confirm and/or validate an information collected by the first machine 106 and/or provide the information in lieu of any sensors disposed on the first machine 106. The aerial machine 116 comprises any airborne machine configured to controllably traverse a portion of the work surface 102 and/or the worksite 104. For example, the aerial machine 116 may comprise a drone, helicopter, plane, or other like machine configured to make multiple passes along the work surface 102 and/or worksite 104 and in accordance with a desired travel path. Additionally, the aerial machine 116 carries one or more fourth sensor(s) 120. The fourth sensors 120 can be the same as and/or different from the first sensors 110 of the first machine 106. In some further examples, the aerial machine 116 operates the same as and/or similarly to the mobile machine 114.

As shown in FIG. 1, the first machine 106 further includes a first computing device 122. In such examples, the first computing device 122 further includes a first processor 124, a first memory 126, and a first user interface 128. The first processor 124 is an electronic controller that operates in a logical fashion to perform operations, execute control algorithms, store and retrieve data and other desired operations. The first processor 124 can include or access memory, secondary storage devices, processors, and any other components for running an application. The memory and secondary storage devices can be in the form of read-only memory (ROM) or random access memory (RAM) or integrated circuitry that is accessible by the first processor 124. Various other circuits can be associated with the first processor 124 such as power supply circuitry, signal conditioning circuitry, driver circuitry, and other types of circuitry. The first user interface 128 can comprise an analog, digital, and/or touchscreen display, and such a control interface is configured to display, for example, at least part of the multi-layer material property map of the work surface 102 and/or of the worksite 104 generally, a travel path associated with the first machine 106, one or more alerts, requests, or other information provided to an operator of the first machine 106, boundaries, centerlines, or other information associated with a portion of the work surface 102 acted on by one or more other machines of the system 100, material properties of at least a portion of the work surface 102 associated with its respective layer, and/or other information. The first user interface 128 may also support other functions including, for example, sharing various operating data with one or more other machines of the system 100. In some examples, a display of the control interface is operable to display a worksite map that identifies at least part of a paving surface and/or one or more layers with associated information located beneath the paving surface.

The first processor 124 may be a single processor or other device, or can include more than one controller or processor configured to control various functions and/or features of the system 100. As used herein, the term "processor" is meant in its broadest sense to include one or more controllers, processors, and/or microprocessors that are associated with the system 100, and that can cooperate in controlling various functions and operations of the components (e.g., machines) of the system 100. The functionality of the first processor 124 can be implemented in hardware and/or software without regard to the functionality. The first processor 124 relies on one or more data maps and/or sensor data relating to the operating conditions and the operating environment of the system 100 that can be stored in the first memory 126 associated with the first processor 124. Each of these data maps can include a collection of data in the form of tables, graphs, and/or equations to maximize the performance and efficiency of the system 100 and its operation.

The first computing device 122 is configured to facilitate interoperability between the components it contains, and to receive data sensed from the first sensor 110. In some further examples, the first processor 124 is configured to operate pursuant to instructions stored in the first memory 126 and, in some cases, the first processor is configured to cause the first user interface 128 to display and/or otherwise provide information. In some examples, the second machine 108 includes a second computing device 130. In such examples, the second computing device 130 includes the same, similar, and/or different components than the first computing device 122 of the first machine 106. Furthermore, the second computing device 130 can operate in the same, similar, and/or different ways as the first computing device 122 as described herein.

In the example shown in FIG. 1, the computing device 122 of the first machine 106 and the computing device 130 of the second machine 108 are in communication and/or otherwise connected with each other via a network 132. The network 132 can be a local area network ("LAN"), a larger network such as a wide area network ("WAN"), or a collection of networks, such as the Internet. Protocols for network communication, such as TCP/IP, can be used to implement the network 132. Although embodiments are described herein as using a network 132 such as the Internet, other distribution techniques can be implemented that transmit information via memory cards, flash memory, or other portable memory devices. The network 132 can implement or utilize any desired system or protocol including any of a plurality of communications standards. The desired protocols will permit communication between the first processor 124, the additional computing device(s) 134, a second processor 144, the various machines described herein, and/or any other desired machines or components of the system

100. Examples of wireless communications systems or protocols that can be used by the system 100 described herein include a wireless personal area network such as Bluetooth® (e.g., IEEE 802.15), a local area network such as IEEE 802.11b or 802.11g, a cellular network, or any other system or protocol for data transfer. Other wireless communication systems and configurations are contemplated. In some instances, wireless communications can be transmitted and received directly between the components of the system 100 (e.g., between machines). In other instances, the communications can be automatically routed without the need for re-transmission by remote personnel.

In further examples, computing devices of two or more of the first machine 106, the second machine 108, the mobile machine 114, and/or the aerial machine 116 are in communication and/or otherwise connected with each other via the network 132. In some further examples, the network 132 further connects one or more of an additional computing device(s) 134 and/or one or more of a satellite(s) 136. Thus, as described herein, the network 132 is configured to facilitate communication between any one or more machines disposed at and/or remote from the worksite 104, computing platforms at and/or remote from the worksite 104, other worksites and/or material processing and/or holding plants, and the like. The additional computing device(s) 134 can also comprise components of the system 100. Such additional computing device(s) 134 can comprise, for example, mobile phones, laptop computers, desktop computers, and/or tablets of project managers (e.g., foremen) overseeing daily paving operations at the worksite and/or at the paving material plant. Such additional computing device(s) 134 can include and/or be configured to access one or more processors, microprocessors, memories, or other components. In such examples, the additional computing device(s) 134 have components and/or functionality that is similar to and/or the same as the first processor 124.

As shown in FIG. 1, the example system 100 also includes a computing platform 138 in communication with and/or otherwise connected to the network 132. In such examples, the computing platform 138 includes a second user interface 140 and a second memory 142. The second user interface 140 provides a centralized location (i.e., back office) an ability to perform actions (i.e., manually, semi-autonomously, and/or fully autonomously) including data and/or layer input, selectively sending out, via the network 132, information and/or at least a portion of the multi-layer material property map, and the like. The second memory 142 can store computer readable media, material lookup tables, machine learning algorithmic instructions, compiled sensor data, the multi-layer material property map, and the like. In some further examples, the computing platform 138 includes the second processor 144 which includes a map generator 146. Such a map generator 146 may comprise a software component of and/or associated with the second processor 144 (e.g., an executable software component stored in the second memory 142) or a hardware component of the second processor 144 (e.g., a map generation engine or module configured to generate one or more of the material property maps described herein based on information received by the computing platform 138). In some examples, the second processor 144 performs tasks provided by stored instructions in the second memory 142 including, but not limited to, initiating the map generator 146 which generates the multi-layer material property map based at least in part on the received information, via the network 132, from one or more sensors disposed on one or more machines.

As will be described in greater detail below, in various examples, the material property map is provided as a set of one or more map layers associated, at least in part, with an operation of the first machine 106 at the worksite 104. In such examples, the map layers may include data sensed prior to an operation at the worksite 104 by the first machine 106. For example, the mobile machine 114 traverses the work surface 102, and the sensors 118 collect and/or otherwise determine one or more material properties of the work surface 102. The sensors 118 and/or the computing device of the mobile machine 114 transmits the determined information, via the network 132, to the computing platform 138, and the map generator 146 generates a first layer of the multi-layer material property map based at least in part on such information. The computing platform 138 can, via the network 132, send at least a portion of the multi-layer material property map to the first computing device 122 of the first machine 106. In such instances, the multi-layer material property map may comprise a three-dimensional (3D) representation of the work surface 102 and/or other portions of the worksite 104. In some further instances, the multi-layer material property map may not be visible on a machine display and/or the machine does not include a display, but data and/or information included in the map can still be accessible to the machine and the machine can still contribute data and/or information to the map. In some additional instances, the multi-layer material property map is viewable via a website, an application, and the like. As such, the map and/or the map data and/or information can be accessible without the need for a machine with an onboard display. In any of the examples described herein, the first computing device can cause the user interface 128 to display at least part of the material property map. As will be described below, example material property maps include one or more data fields configured to receive input of new data and/or new layer requests (i.e., manually, semi-autonomously, and/or fully autonomously), and the like. In further instances, the at least a portion of the multi-layer material property map can inform the operation of the first machine 106 (i.e., manually, semi-autonomously, and/or fully autonomously). In further instances, the operation of the first machine 106 and any associated material property changes, collected via the first sensor 110, can be transmitted to the computing platform 138, via the network 132, and included in the multi-layer material property map. In such instances, the computing platform 138 transmit at least a portion of the multi-layer material property map, via the network 132, back to the first machine 106, the second machine 108, and/or the like.

In some examples, the material property map includes one or more layers, involving information of the first machine 106 based on one or more conditions that have and/or have not changed during operation of the first machine 106 at the worksite 104. The condition(s) include a change in location at the worksite, change in environmental conditions (e.g., temperature, precipitation, humidity, etc.), change in road conditions (e.g., grade, curvature, type of road surface, etc.), change in sensors used (e.g., sensors activated and/or deactivated), change in time, change in intervening machine operations, change in material properties, and the like.

In some examples, the material property map layers and/or information are based on one or more planned changes in a condition at the worksite. In such examples, the map layers are determined based on worksite information and/or manual input, such as that stored and/or inputted through the second user interface 140 associated with the computing platform 138, and/or other computing devices associated with the system 100 (e.g., the map generator 146, the first computing device 122, the second computing device 130, and/or the additional computing device(s) 134). In some examples, the second layer associated with the material property map is inputted manually (e.g., an operator) as appropriate. In some other instances, the second layer associated with the multi-layer material property map is generated as triggered by a new machine operation conducted at a second time associated with the first area. In further examples, where no triggering event generating a new layer occurs, the system 100 continuously and/or dynamically updates and/or imports the sensed information onto a current map layer.

In some examples, the material property map layers and/or information are based on sensor information captured by one or more sensors located at the worksite 104. In some examples, the first machine 106 provides information to the computing platform 138. For instance, in examples in which the first machine 106 comprises a compactor performing a compacting operation or task, the first sensor 110 collects information indicative of a first material property at a first time. The first sensor 110 of the first machine 106 may also collect information at the same portion of the worksite 104 at a second time, after the first time. In some other examples, the mobile machine 114 and the aerial machine 116 can carry an additional one or more of the third sensors 118 and the fourth sensors 120, respectively, and collect additional information.

In example embodiments, the first machine 106, the second machine 108, the mobile machine 114, the aerial machine 116, and/or other such device, are in communication with the one or more GPS satellite 136 and/or UTS to determine a respective location of the respective machine to which any one of the location sensors associated with the respective machines is connected continuously, substantially continuously, or at various time intervals. One or more additional machines of the system 100 can also be in communication with the one or more GPS satellite 136 and/or UTS, and such GPS satellite 136 and/or UTS are also configured to determine respective locations of such additional machines. In any of the examples described herein, machine locations determined by the respective location of the respective machines are used by the computing platform 138, the first computing device 122, the second computing device 130, and/or other components of the system 100 to coordinate activities of any of the respective machines and/or other components of the system 100. In some other instances, the respective locations of the machines can include metadata (e.g., time) for use by the map generator 146 in generating map layers, determining new layers, and/or updating existing layers. For example, the map generator 146 combines the location and time information (i.e., metadata) with a sensed material property to incorporate this information into at least a portion of the material property map.

In some further examples, the map generator 146 receives information associated with a first timestamp and receive information associated with a second timestamp, the second timestamp being later than the first timestamp. The map generator 146 may update the material property to include the information because it is the most recent information. In some instances, the map generator 146 determines that a first machine operation associated with the information, having a first timestamp, is a different machine operation from a second machine operation associated with the information, having a second timestamp that is later than the first timestamp. The map generator 146 generates a first layer of the material property map according to the first operation and a second layer according to the second operation and/or a current operation.

In some examples, the map generator 146 includes one or more machine learned models (e.g., data models) configured to output the multi-layer material property map for the first machine 106 and/or the second machine 108. In some examples, the data model(s) are trained utilizing data including sensor data, historical multi-layer material property maps, settings for operating parameters associated with a machine, production data and associated times, fuel used, fuel burn rate, and the like. In such examples, the data model(s) is configured to input sensor data associated with the first machine 106 and/or the second machine 108 (e.g., location data, environmental data, operating data, etc.) and output an updated and/or new layered multi-layer material property map for the first machine 106 and/or the second machine 108. The map generator 146 processes sensor data from the sensors and production data associated with the respective machine associated with the sensors. In some examples, based on a determination that the sensed data meets or exceeds a threshold, the map generator 146 trains the data model(s) based on the production data and/or sensor data. For example, when sensed data meets or exceeds a threshold, the map generator 146 generates a new layer to the multi-layer material property map. In other examples, the map generator 146 trains the data model(s) based on previous manual new layer inputs to generate a new layer consisted with historical conditions prompting manual inputs. In some further examples, the map generator 146 trains the data model(s) based on the changing of a machine operation associated with the first machine 106 to a different machine operation associated with the second machine 108 to generate a new layer and/or update and existing layer. In some examples, the map generator 146 may reference lookup tables stored in the second memory 142 and/or additional computing devices 134 to associate, compute, compare, etc. of collected information.

Figure 2:
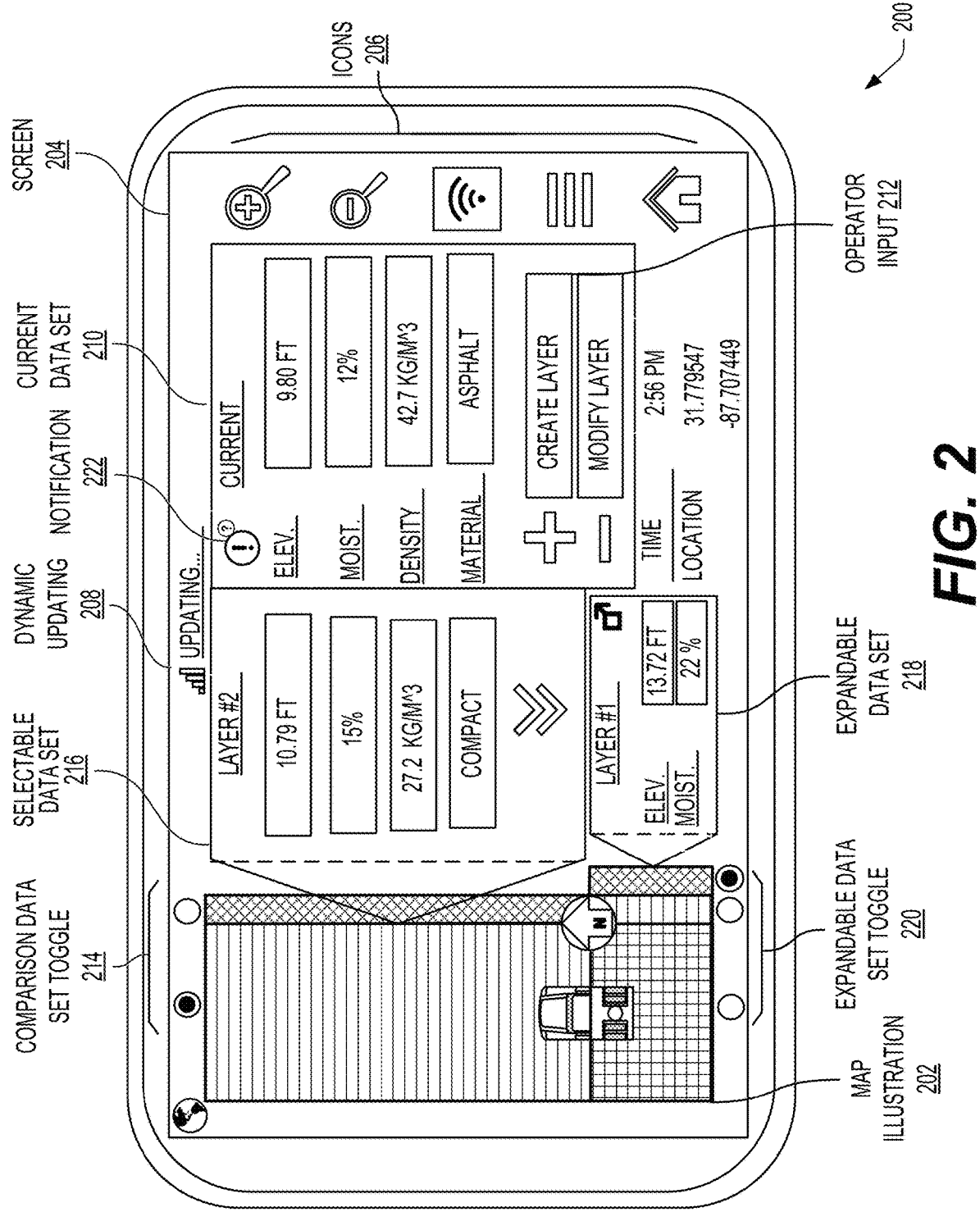
FIG. 2 is an example screenshot of a user interface displaying at least part of a multi-layer material property map and associated information according to an example embodiment of the present disclosure.

FIG. 2 illustrates an example screenshot of a user interface 200 illustrating at least part of an example material property map. The user interface 200 shown in FIG. 2 can utilize any appropriate technology for display and/or manipulation of the displayed elements. For example, the user interface illustrated in FIG. 2 comprises an analog, digital, and/or touchscreen display configured to display at least part of the material property map as a map illustration 202 via a screen 204. The user interface 200 further includes a set of icons 206 to assist in navigating the one or more elements illustrated on the screen 204. In some further instances, the user interface 200 can include a dynamic updating indicator 208 to inform the operator that real-time data is reflected in a current data set 210 on the user interface 200. Furthermore, in some instances, the data displayed by the current data set 210 may prompt an operator to initiate a new map layer. For example, the current data set 210 additionally includes an operator input field 212 whereby the operator can provide an input indicative of a request to generate a new/additional layer of the material property map. In some further examples, the operator input field 212 can allow an operator to input known data, adjust measured data, overwrite data as directed, and the like. In some other examples, a comparison data set toggle 214 facilitates a side by side comparison of the current data set 210 and a selectable data set 216. In some further examples, it may be advantageous and/or desirable to view more detailed information relating to a layer of the multi-layer material property map. In such instances, an expandable data set 218 can be selected via an expandable data set toggle 220. In some other examples, a user can receive a notification 222 indicative of a warning, suggestion, notice, and the like. For example, a user may receive the notification 222 notifying the user of an impending new layer event and/or trigger. In such examples, the user may provide an input, via the user interface 200, indicating acceptance and/or approval of the generation of the new layer. Alternatively, the user may provide an input, via the user interface 200, cancelling or overriding the generation of the new layer.

The portion of the material property map illustrated by the user interface 200 includes a two and/or three-dimensional (2D/3D) element corresponding to one or more map layers displayed, via the screen 204, as the map illustration 202. The portion of the material property map illustrated can include one or more layers illustrated as two and/or three-dimensional elements. The user interface 200 includes one or more windows which include information displayed in association with the map illustration 202. The user interface 200 also includes the icons 206 which are configured to receive input via the screen 204. Each icon 206 corresponds to a respective operation of the first machine 106 carrying the first computing device 122. The user interface 200 can enable a user (i.e., operator) to indicate a new layer via the operator input 212 and/or the icons 206. Additionally, the user can, via the screen 204 of the user interface 200, selectively choose one or more of the two and/or three-dimensional elements of the portion of the map illustration 202. Upon selection, by the second processor 144 via the screen 204, of a selection of one or more layers, the screen 204 can be caused to display information corresponding to the one or more layers. The displayed information corresponding to the one or more selected layers includes at least one of time of information collection, the machine associated with the information collection, the machine work (i.e., operation) performed, the location (i.e., coordinates) of the collected information, elevation, material density, moisture levels, material composition, material temperature, suggested actions, and the like. As such, the displayed information can be contained within the current data set 210, the selectable data set 216, the expandable data set 218, the screen, generally, and/or the like.

The forgoing selectivity of material property map layers also applies to the second machine 108 having the second computing device 130. The user (i.e., operator) of any respective machine having an associated user interface can access the material property map, select desired and/or appropriate layers, and provide user inputs via the respective machine's associated user interface. Inputs and/or operations that may alter the illustration of the material property map can be transmitted via the network 132 to the computing platform, other machines, and/or additional computing devices 134.

As shown in FIG. 2, in some examples the user interface 200 includes a visual representation of at least part of the worksite 104 and/or the work surface 102. For example, the user interface 200 displays the map illustration 202 of a two-dimensional or three-dimensional representation located on a left-hand side of the user interface 200. At least a portion of the map illustration 202 may be selectable for one or more reasons. For example, the expandable data set toggle 220 can indicate a selected portion of the map illustration 202 and the expandable data set 218 appears in a window located on a right-hand side of the map illustration 202 to indicate a correspondence between the map illustration 202 and collected material property information viewably contained within the expandable data set 218.

In some other examples, the comparison data set toggle 214 indicates a separate selection on the map illustration 202. For example, the comparison data set toggle 214 can correspond to the selectable data set 216 which can appear in a window located on a right-hand side of the map illustration 202 to indicate a correspondence between the map illustration 202 and collected material property information viewably contained within the selectable data set 216. In some further instances, the current data set 210 can be appear in a window located on a right-hand side of the selectable data set 216 enabling a user (i.e., operator) to compare information contained within the selectable data set 216 and the current data set 210 which contains information resulting from a current machine operation, previously sensed information from the layer, and/or newly sensed information from the layer.

As shown in FIG. 2, the operator input field 212 is configured to enable an operator to manually generate and/or otherwise add a new layer to the material property map and/or indicate that the current machine operation will modify the current layer. For example, the operator can view and/or compare the selectable data set 216 and the current data set 210 to determine whether to initiate creation of a new layer via the operator input field 212. In some examples, the operator may initiate creation of a new layer via the operator input field 212 irrespective of a comparison between the selectable data set 216 and the current data set 210. In other examples, the operator can receive instruction from a back office, the computing platform 138, the second machine 108, and/or additional computing devices 122 to initiate a new layer via the operator input field 212. In some other instances, the operator can elect to maintain the current map layer and, instead, modify the layer pursuant to the machine operation to be performed. For example, in applications in which a paving material mat has been deposited on the work surface 102 by a paving machine, and in which the material property map already includes a layer representing the paving material mat, a next operation to be performed on the work surface 102 may include a compaction operation performed by a compaction machine. In such examples, the operator may elect to maintain the existing layer of the material property map representing the paving material mat, and may cause, for example, the map generator 146 to modify the existing layer based modifications made to the paving material mat (e.g., change in elevation, change in temperature, change in density, change in moisture content, etc.) during the ensuing compaction operation. The motivations to modify the layer, instead of creating a new layer, are many and further motivations will be apparent to one skilled in the art.

The user interface 200 also displays additional data. For example, the user interface 200 can include location coordinates associated with the map illustration 202 and indicate a location of the machine associated with the user interface 200. The user interface 200 can also include location and/or time identification contained with the expandable data set 218, selectable data set 216, and/or the current data set. In some examples, each of the layers represented in the map illustration 202 contain information related to location and time that can be viewable in any of the aforementioned ways. As noted above, in further examples, such information includes, for example, labels, location names, GPS coordinates of the respective locations, and/or other information.

The user interface 200 further includes text, coordinate indicators, markers, segments, linear demarcations, hash marks, and/or other visual indicia (i.e., within the map illustration 202, the expandable data set 218, the selectable data set 216, the current data set 210, and the like) indicating various increments of distance traveled by any one or more of the machines including the first machine 106, the second machine 108, the mobile machine 114, and the aerial machine 116. As noted above, each visual indicia can be indicative of an increment of distance traveled, differing ranges of density, and/or any other additional collected (i.e., sensed) material property information. In any of the embodiments described herein, the map illustration 202 and/or other components of the user interface 200 are displayed and/or updated in real-time, as indicated by the dynamic updating 208, to assist the operator in controlling any one of the machines and/or generating additional map layers via the operator input field 212. Additionally, in some embodiments at least one of the displays via the screen 204 can scroll from the bottom of the user interface 200 to the top of the user interface 200, or vice versa, to indicate changes in the material properties, in real time. Moreover, as shown in FIG. 2, one or more of the visual indicia and/or other components of the user interface 200 can be displayed together with additional information associated with the material property map. For example, such components of the user interface 200 is displayed together with grade information indicating a slope and/or grade of the mat as laid, thickness information indicating a thickness of the mat as laid, direction information indicating a direction required to achieve a thickness and/or slope of the mat, and/or other operational information that is helpful to an operator.

As shown in FIG. 2, in some examples the user interface 200 displays, via the screen 204, the set of icons 206 located on a right-hand side of the screen 204 to facilitate additional operations associated with the user interface. The user interface 200, as illustrated in FIG. 2, is representative of one possible display and/or arrangement of various elements as provided to an operator. For example, the user interface 200 is shown to display the map illustrations 202, user input functions (i.e., the expandable data set toggle 220, the comparison data set toggle 214, the operator input field 212, and the icons 206), and associated data set illustrations (i.e., the current data set 210, the selectable data set 216, and the expandable data set 218). As such, additional and/or different orientations and/or arrangements of elements can be appropriate to display.

FIG. 2 further illustrates the notification 222 which can be displayed on the user interface 200, via the screen 204. The notification 222 can be a static symbol and/or a dynamic symbol. In the case of a dynamic symbol, the notification 222 can be interactive and redirect the user to a new window, overlay, or other user interface component providing the details prompting the notification 222. The notification 222 can present a user with a multitude of information including warnings, suggestions, updates, and the like. For example, the user of the first machine 106 could be starting to perform a machine operation upon the work surface 102 without electing to create a new layer or modify the existing layer via the operator input 212. As such, the notification 222 can inform the user of this omission and remind the user to make an election and/or present the user with the controls to make the election. In some further instances, the notification 222 can indicate that a layer of the multi-layer material property map has been removed in part or in whole. In some other examples, the notification 222 can present the user with information indicating that the map generator 146 intends to create a new map layer. As such, the notification 222 can provide the user with an override function to either accept or decline generation of the new map layer. In some further instances, the notification 222 can provide the user with diagnostics information associated with the machine. The foregoing functionality of the notification 222 described is merely exemplary and it should be appreciated that additional functionality may be apparent to one skilled in the art.

Figure 3:
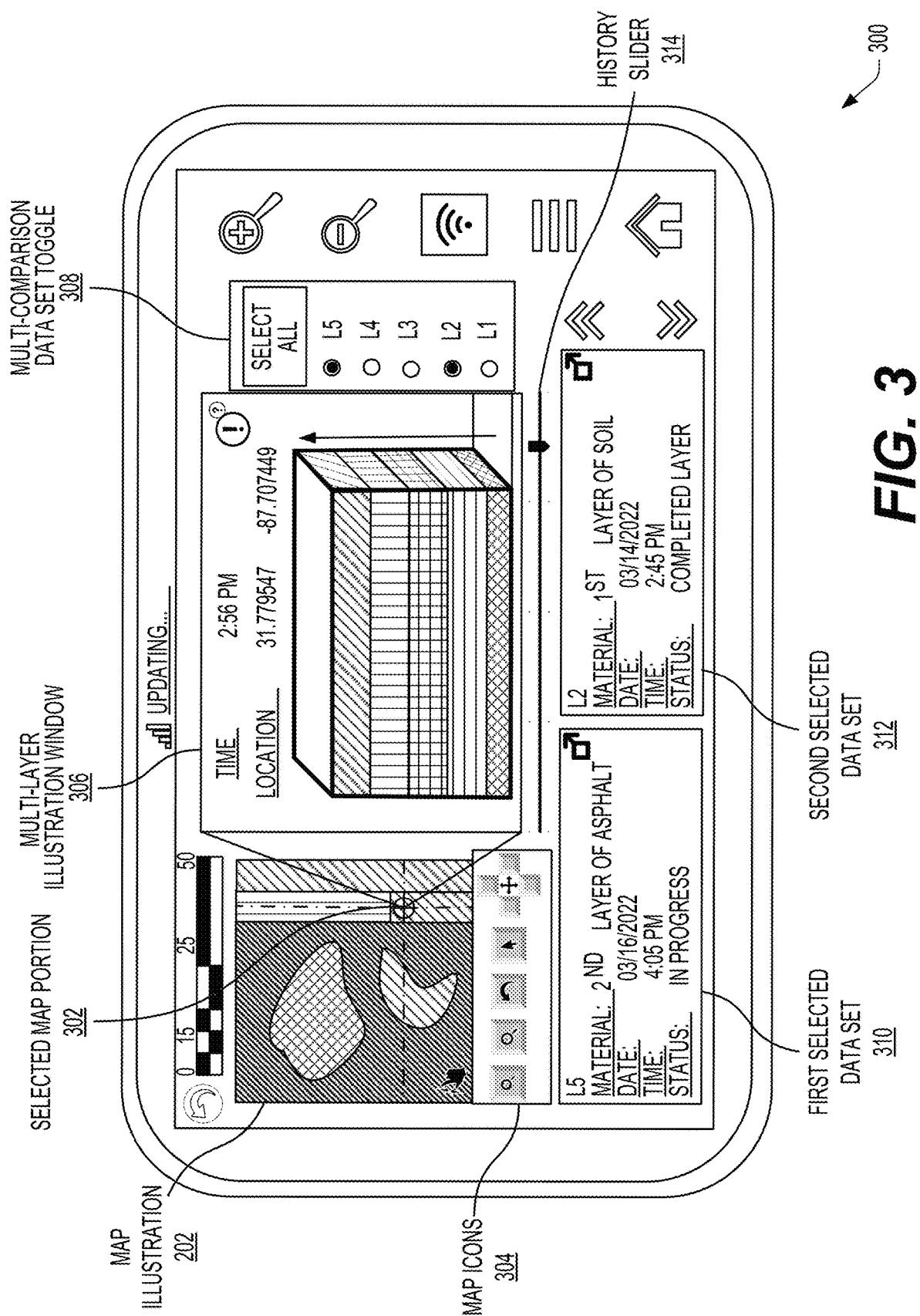
FIG. 3 is another example screenshot of a user interface displaying at least part of a multi-layer material property map and associated information according to an example embodiment of the present disclosure.

FIG. 3 illustrates an example screenshot of another user interface 300 associated with illustrating at least part of the multi-layer material property map. The user interface 300 renders, via the screen 204, a selected map portion 302 of the material property map via the map illustration 202. A set of map icons 304 facilitates selecting the selected map portion 302 of the map illustration. In some further instances, the map icons 304 can allow for selection, deselection, zooming, and the like. In some instances, selection of the selected map portion 302 renders a multi-layer illustration window 306 to appear, illustrating the associated layers with the selected map portion 302 of the worksite 104. In some further examples, a multi-comparison data set toggle 308 can allow for the selection of one or more layers. In such examples, a first selected data set 310 and a second selected data set 312 can correspond to two selected layers via the multi-comparison data set toggle 308. In some further instances, the multi-comparison data set toggle 308 and the corresponding first selected data set 310 and the second selected data set 312 provides greater insight into the variability and/or material properties of isolated layers of the multi-layer material property map. In some additional instances, the user interface 300 includes a history slider 314 or other component which can be used to view changes to and/or the progression of the work surface 102, via the multi-layer illustration window 306.

As shown in FIG. 3, in some examples the user interface 300 displays a visual representation of at least part of worksite 104 and/or the work surface 102. For example, the user interface 300 displays the map illustration 202 of a two-dimensional or three-dimensional representation located on a left-hand side of the user interface 300. At least a portion of the map illustration 202 may be selectable for one or more reasons via the set of map icons 304. For example, the user interface 300 indicates a selected portion of the map illustration 202 and the multi-layer illustration window 306 appears in a window located on a right-hand side of the map illustration 202 to indicate a correspondence between the map illustration 202 and a representation of the layers of the map viewably contained within the multi-layer illustration window 306.

As shown in FIG. 3, the multi-layer illustration window contains a multi-dimension representation of the selected map portion 302 of at least a portion of the worksite 104 and selectable using the set of map icons 304. The multi-layer illustration window 306 contains information including the number of layers, current time and/or respective times for each layer, location of the selection, and the like. As shown in FIG. 3, in some examples the user interface 300 may display at least part of worksite 104 and/or the work surface 102 in the multi-layer illustration window 306. At least a portion of the map illustration 202 is selectable for one or more reasons via the set of map icons 304. For example, the user interface 300 can indicate a selected portion of the map illustration 202 and a multi-layer illustration window 306 appears, located on a right-hand side of the map illustration 202 to indicate a correspondence between the map illustration 202 and a representation of the layers of the map viewably contained within the multi-layer illustration window 306. In some other instances, the multi-comparison data set toggle 308 can appear, located on a right-hand side of the multi-layer illustration window 306. The multi-comparison data set toggle can include one or more selections corresponding to the number of layers as indicated in the multi-layer illustration window 306.

In some examples, selection of one or more layers within the multi-comparison data set toggle 308 is shown to result in opening a data set window corresponding to the selected layer(s). For example, as shown in FIG. 3, selection of a layer L5 and a layer L2 results in opening the corresponding first selected data set 310 window and the second selected data set 312 window. The first selected data set 310 and the second selected data set 312 can appear in a window located below the map illustration 202, the multi-layer illustration window 306, and/or the multi-comparison data set toggle 308. Additionally, the first selected data set 310 can appear in a window to the left of the second selected data set 312 to provide side by side data and/or information comparison. The respective data sets enable a user (i.e., operator) to compare information contained within the first selected data set 310 and the second selected data set 312 which both contain information resulting from a current and/or past machine operation, previously sensed information from each of the selected layers, and/or newly sensed information from each of the selected layers. Additionally, the first selected data set 310 and the second selected data set 312 can be expandable and/or open a new window corresponding to the selected layer.

FIG. 3 further illustrates the history slider 314 which can be used in conjunction with the multi-layer illustration window 306. For example, as shown in FIG. 3, the multi-layer illustration window 306 can display a multi-dimensional representation of a selected map portion 302 associated with the work surface 102. The history slider 314 can provide the user with the ability to view information indicating the progression of changes made to the work surface 102 as collected and rendered by the map generator 146. For example, sliding the history slider 314 to the left can show the condition of the work surface 102, as illustrated in the multi-layer illustration window 306, at previous times, moments, data collection moments, and the like. As such, the layers may vary as the history slider 314 is manipulated. Further, although the example user interface 300 shown in FIG. 3 includes a history slider 314, in other examples, the user interface 300 may include one or more icons or other controls instead of the history slider 314. Such icons or other controls may be configured to receive input from the user, and may be configured to provide the user with the ability to view information indicating the progression of changes made to the work surface 102 based on such input.

As illustrated in FIG. 3, the user interface 300 is representative of one possible display and/or arrangement of various elements as provided to an operator. For example, the user interface 300 is shown to display the map illustration 202, the selected map portion 302 via the map illustration 202, the multi-layer illustration window 306 associated with the selected map portion 302, and more detailed information associated with selected layers via the multi-comparison data set toggle 308. As such, in some instances, it may be appropriate to display more detailed information pertaining to specific map layers.

Figure 4:
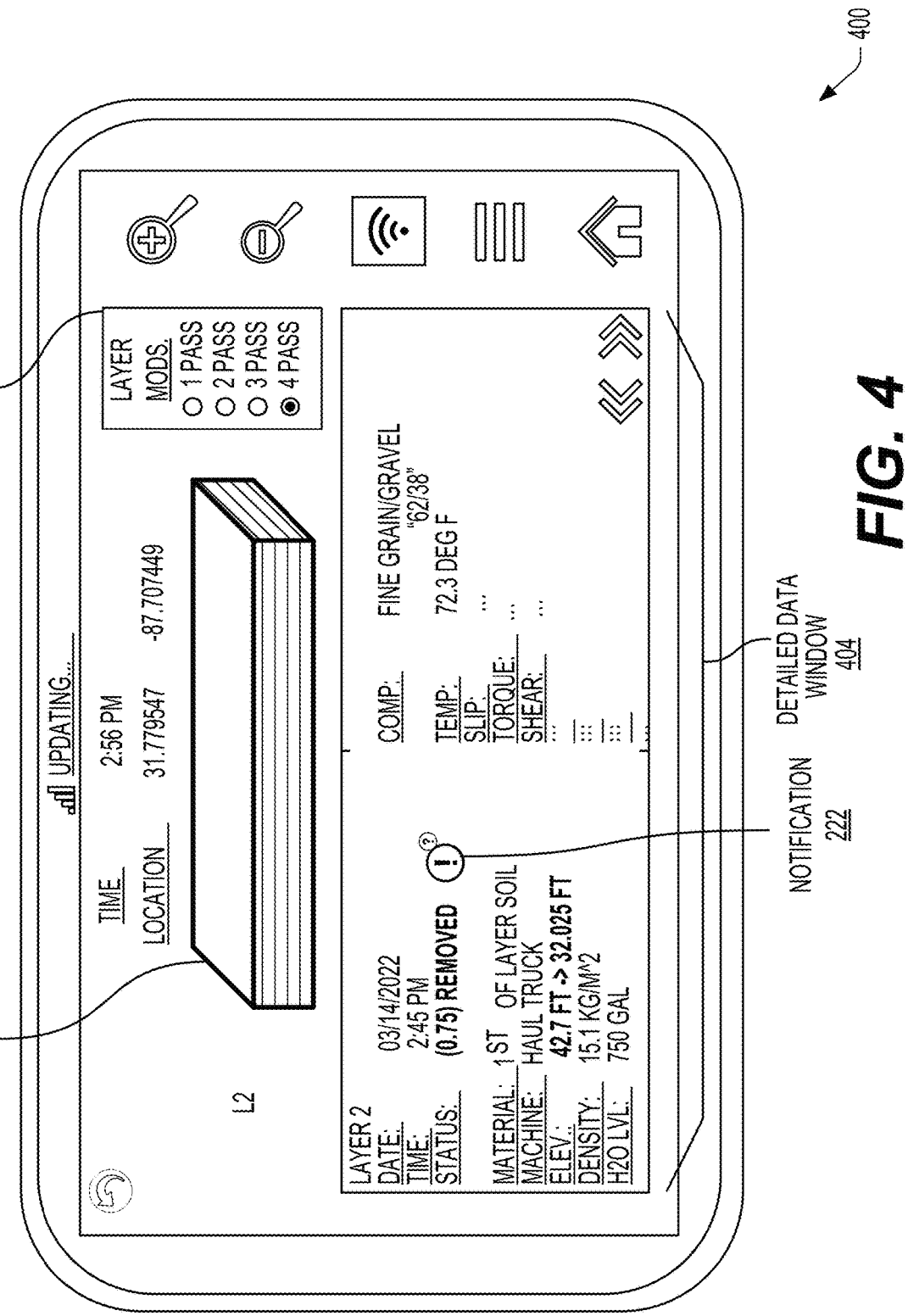
FIG. 4 is yet another example screenshot of a user interface displaying at least part of a multi-layer material property map and associated information according to an example of the present disclosure.

FIG. 4 illustrates still another example screenshot of a user interface 400 associated with illustrating at least one layer of the material property map. The user interface 400 renders, via the screen 204 (of FIG. 2), a single layer illustration 402. In some instances, the single layer illustration 402 may be associated with the second selected data set 312 (of FIG. 3) and provide a more detailed data set associated with the selected layer. A detailed data window 404 can accompany the single layer illustration 402 and provide additional and/or different information. A historical data window 406 can further accompany the single layer illustration 402 and the detailed data window 404 and provide access to additional information and/or data relating to the selected layer.

As shown in FIG. 4, the second selected data set 312 has been expanded and/or opened a new window. The user interface 400 is rendered via the screen 204 associated with the second selected data set 312. As shown in FIG. 4, in some examples the user interface 400 indicates the single-layer illustration 402 and appears in a full window and indicating a correspondence with the map second selected data set 312. The user interface 400 further includes the detailed data window 404 containing the collected information associated with the selected layer of the material property map. In some instances, the detailed data window 404 displays the notification 222. For example, a layer can be removed by subsequent machine operations. As such, a user may be notified within the detailed data window 404, via the notification 222, that the selected layer was removed. In some further instances, the detailed data window 404 can include information relating to the removed layer including an amount (e.g., a volume) of material removed from the work surface 102, a type or composition of the material removed, one or more changes in a property (e.g., elevation, density, etc.) of the current/remaining layer of the work surface 102 caused by and/or associated with the removal of such material, and the like. The user interface 400 further includes the historical data window 406 containing the collected, historical data associated with the selected layer of the material property map. The historical data window 406 can provide a user with access to information indicating previous modifications to the work surface 102 and/or to overwritten historical data. In some instances, the historical data window 406 is structured according to the number of machine operation passes in consecutive order. In some other instances, the historical data window 406 is structured according to changes and/or modifications via consecutive timestamps. In some further instances, the historical data window 406 can be structured according to user commanded new layers in consecutive order.

It is also understood that any of the example user interfaces described herein can be interactive. For example, in embodiments in which the respective user interfaces comprise a touch screen or other like component, an operator provides touch inputs to obtain additional information and/or to affect the display of information. For example, the respective user interfaces can include one or more tags or other like input fields. In such examples, tagged information include, for example, a ticket number, a project number or other identifier, a license plate number or other machine identifier, a date and/or time at which the machine ticket was printed at the paving material plant, and/or other like information. In examples corresponding to paving operations, the corresponding layer includes paving material information which can further include, for example, a type, composition, and/or description of the paving material 110, a mass of the paving material 110, and/or other like information.

Figure 5:
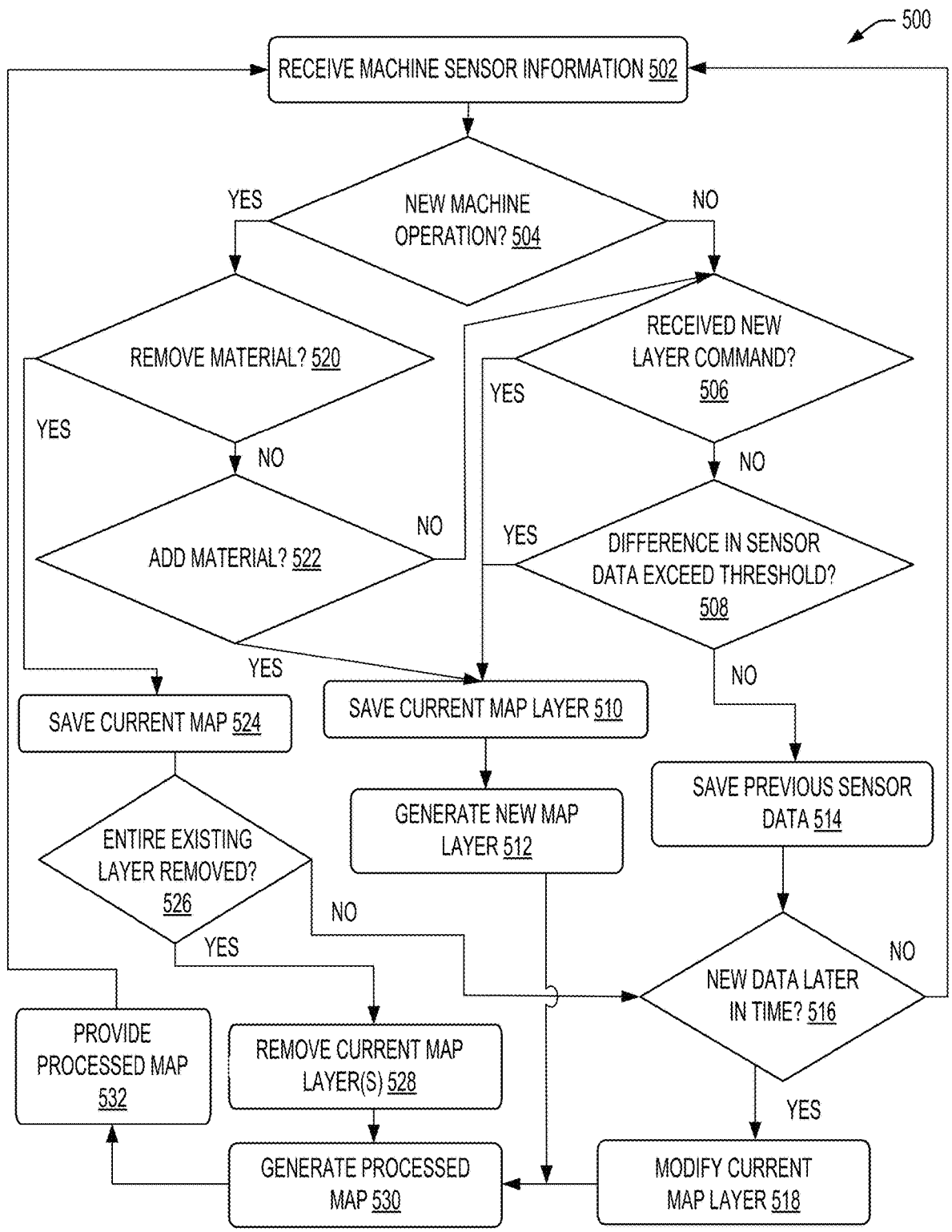
FIG. 5 is a flow chart depicting a method of generating a multi-layer material property map in accordance with an example embodiment of the present disclosure.

FIG. 5 illustrates a flow chart depicting a method 500 of generating a multi-layer material property map in accordance with an example embodiment of the present disclosure. The example method 500 is illustrated as a collection of steps in a logical flow diagram, which represents operations that can be implemented in hardware, software, or a combination thereof. In the context of software, the steps represent computer-executable instructions stored in memory. When such instructions are executed by, for example, the computing platform 138, such instructions cause the first machine 106, the second machine 108, and/or the additional computing devices 122, generally, to receive instructions corresponding to producing at least a portion of the multi-layer material property map. Such computer-executable instructions can include routines, programs, objects, components, data structures, and the like that perform particular functions or implement particular abstract data types. The order in which the operations are described is not intended to be construed as a limitation, and any number of the described steps can be combined in any order and/or in parallel to implement the process. For discussion purposes, and unless otherwise specified, the method 500 is described with reference to the first machine 106 and the computing platform 138 of FIG. 1, as well as the user interface 200 of FIG. 2.

As will be described in greater detail below with respect to FIG. 5, an example method 500 entails receiving machine sensor data and receiving multi-layer map generation instructions. The method 500 further includes receiving an input indicative of a request to generate a new map layer, determining whether received sensor data exceeds a threshold, and generating a map layer based at least in part on such determinations.

For example, at operation 502, the processor 144 of the computing platform 138 receives sensor data collected, sensed, and/or otherwise determined by one or more of the first sensors 110 disposed on first machine 106, via the network 132. As described above, one or more of the first sensors 110 include a lidar sensor, a radar sensor, a camera (e.g., RGB, IR, intensity, depth, time of flight, etc.), an audio sensor, an ultrasonic transducer, a sonar sensor, a location sensor (e.g., global positioning system (GPS), compass, etc.), an inertial sensor (e.g., inertial measurement units, accelerometers, magnetometers, gyroscopes, etc.), an environment sensor (e.g., temperature sensors, humidity sensors, light sensors, pressure sensors, etc.), or the like. Additionally, one or more of the first sensors 110 includes a sensor configured to determine the density, composition, moisture level, and/or other characteristics of the work surface 102.

At operation 504, the map generator 146 associated with the processor 144 determines whether a new machine operation necessitating a new layer has been made. The new machine operation can have been made via a user (i.e., operator) of the first machine 106 and/or the second machine 108. In some instances, the new machine operation and subsequent need for a new layer be predicated upon a predetermined programming and/or prestored instruction within the second memory 142 associated with the computing platform 138. For example, certain new machine operations may not alter the work surface 102 of the worksite 104 in a way that would need a new layer for the multi-layer material property map. For example, a first machine operation could be a first compaction of the work surface 102 and a second machine operation could be a second compaction. As such, the sensed data from the first machine operation might not trigger generation of a new map layer where the second machine operation is the same, similar, unaffected, and the like. Further, in such examples, the newly sensed data could, instead, be used by the processor 144 to update stored information corresponding to the existing layer of material. In some further instances, machine learning techniques as explained and alluded to herein have been trained to differentiate the conditions associated with generating a new layer between machine operations. In such examples, sensed data, worksite conditions, and like can be further associated with new machine operations to determine whether a new layer is necessitated.

Based on a determination that a new machine operation was not conducted ("No" at operation 504), the processor 144 will proceed to operation 506.

At operation 506, the map generator 146 associated with the processor 144 determines whether a new layer command or other such input has been received. The new layer input command may comprise a touch input, an audio input, a hand gesture input, or other such input or combination thereof made by a user (i.e., operator) of the first machine 106 and/or the second machine 108 via the operator input field 212 of, for example, the user interface 200. For example, at 506 an operator of the computing platform 138 may provide a manual input via the operator input field 212 of the user interface 200 indicative of a request to generate a material property map. The map generator 146 generates the material property map, based at least in part on receiving such an input, using material property map generation instructions stored in the second memory 142. Such computer-executable instructions can include routines, programs, objects, components, data structures, and the like that perform particular functions or implement particular abstract data types. In some other examples, an operator recognizes and/or receives instruction from a back office and/or a machine learning algorithm associated with the computing platform 138 indicating a desire to create a new layer and manually input one via a user interface associated with the first machine 106 and/or the second machine 108. In some other instances, the new layer command may have been made via the second user interface 140 of the computing platform 138. In some further instances, machines can operate in autonomous/semi-autonomous mode. As such, inputs are received from the operator. In other examples, generation of a new layer may be triggered based on some of the executable instructions and/or rules that the second processor 144 is executing. For example, in a fully autonomous application, certain parameters are previously determined (e.g., a new day) which autonomously create a new layer command. In a semi-autonomous application, for example, the new day can cause the user interface 200 to display a warning and/or suggested action, the warning and/or suggested action to issue a new layer command. The foregoing possibilities detailing the ways the new layer command is generated and/or received are merely exemplary, and there can be a variety of alternative methods made apparent to one skilled in the art. Additionally, as discussed above in FIG. 2, the operator may compare the current data set 210 to the selectable data set 216 and determine that a difference between the two data sets necessitates a new layer. For example, the operator can determine that a difference in elevation, as measured between two data sets, necessitates issuing a new layer command at least based upon the difference between the measured data sets, the current machine operation, comparison between the current machine operation and a one or more previous machine operations, and the like. As such, the operator issues the new layer command via the operator input field 212.

Based on a determination that a new layer command or other such input has not been received ("No" at operation 506), the processor 144 will proceed to operation 508.

At operation 508, the map generator 146 associated with the processor 144 determines whether a difference between the first sensor data and the second sensor data meets or exceeds a threshold difference. The threshold may be based at least in part on the type of sensor data. For example, a first threshold difference can be associated with temperature while a second threshold difference can be associated with humidity and meeting and/or exceeding either the first threshold or the second threshold triggers the creation of a new layer. The threshold may be determined based on experimental data, testing, or the like. In some examples, the thresholds are based on location data and/or road data associated with the machine. For example, material properties associated with asphalt are affected more by temperature than material properties associated with concrete. Thus, a threshold difference in temperature associated with grinding asphalt may be a lower threshold than a threshold difference in temperature associated with grinding concrete. For another example, material properties associated with a first type of aggregate (e.g., limestone) require a first threshold difference based on a detection of ice and/or freezing temperatures and material properties associated with a second type of aggregate (e.g., river rock) require a second threshold difference based on the detection of ice and/or freezing temperatures. For yet another example, a threshold difference in a grade of a road is associated with a different forward speed of the machine. As such, where sensor data has met or exceeded certain thresholds, this can indicate substantial changes and/or modifications to the work surface 102 of the worksite 104 which necessitates a new map layer. For example, paving operations can benefit from compaction operations conducted on the work surface 102 and distinguished as a new map layer.

Based on a determination that the difference between the first sensor data and the second sensor data does not meet or exceed the threshold difference (or threshold value) ("No" at operation 508), the processor 144 will proceed to operation 514.

On the other hand, based on a determination that a new layer command or other such input has been received ("Yes" at operation 506), or based on a determination that the difference between the first sensor data and the second sensor data does exceed the threshold difference ("Yes" at operation 508), the processor 144 will proceed to operation 510.

At operation 510, the map generator 146 associated with the processor 144 saves the current map layer (i.e., sensed data associated with current map layer) of the existing multi-layer material property map via the second memory 142 associated with the computing platform 138. In some instances, the processor 144 saves the current map layer data to the first memory 126 associated with the first machine 106 and/or to the associated memory with the second machine 108 via the network 132. In such examples, the first machine 106 and/or the second machine 108 receive at least a portion of the current map layer associated with the existing multi-layer material property map as shown in FIGS. 2-4. For example, the first machine 106 can be a compactor and possess limited onboard memory. As such, the at least a portion of the current map layer data provided may include information useful and/or beneficial to the operations of the compactor. In some further instances, the processor 144 saves the current map layer data to the additional computing devices 122. In some examples, the saved current map layer is transmitted via the network 132 to the first user interface 128 associated with the first machine 106 as illustrated in FIGS. 2-4. In such examples, the user (i.e., operator) of the first machine 106 retains access to the current map layer to, for example, compare with prior map layers and/or subsequent map layers. As such, the current and/or prior map layers can assist the operator in determining whether manual new layers are necessitated. In some further instances, the current and/or prior map layers, as discussed and alluded to herein, serve to train a machine learning model.

At operation 512, the map generator 146 associated with the processor 144 via the map generator 146 generates, based at least in part on the currently received sensor data, a new map layer associated with the multi-layer material property map. The new map layer overlays the previous layer of at least a portion of the multi-layer material property map. In some examples, the new layers do not cover the full work surface 102 of the worksite 104. In such instances, the multi-layer material property map may have newly generated map layers along a portion of the multi-layer material property map that culminate in a greater number of layers in that portion than in another portion of the map. For example, a first portion of the worksite 104 has experienced a number of passes by the same and/or additional machines that have generated new layers (e.g., manual inputting, exceeding thresholds, new machines operations) while a second, different portion of the worksite 104 has experienced fewer or no machine operations. As such, the first portion can be indicated on the multi-layer material property map to have a multitude of layers while the second portion on the map can have no or fewer layers. The multi-layer material property map further indicates the current state of the worksite including material property changes, machine operations conducted, environmental changes, and the like. From operation 512, the processor 144 proceeds to operation 528, and operation 528 will be discussed in greater detail below.

On the other hand, with reference to previously discussed operation 508, if the processor 144 determines that the difference between the first sensor data and the second sensor data does not exceed the threshold difference ("No" at operation 508), the processor 144 will proceed to operation 514. At operation 514, the map generator 146 associated with the processor 144 saves the previous sensor data (i.e., sensed data associated with current map layer) of the existing multi-layer material property map via the second memory 142 associated with the computing platform 138. In some instances, the processor 144 saves the previous sensor data to the first memory 126 associated with the first machine 106 and/or to the associated memory with the second machine 108 via the network 132. In such examples, the first machine 106 and/or the second machine 108 may receive at least a portion of the previous sensor data associated with the existing multi-layer material property map. For example, the first machine 106 can be a compactor and possess limited onboard memory. As such, the at least a portion of the previous sensor data provided can include information useful and/or beneficial to the operations of the compactor. In some further instances, the processor 144 saves the previous sensor data to the additional computing devices 122. In some other examples, the previous sensor data is transmitted via the network 132 to the first user interface 128 associated with the first machine 106 as illustrated in FIGS. 2-4. In such examples, the user (i.e., operator) of the first machine 106 may retain access to the previous sensor data to, for example, compare with a sensor data associated with prior map layers and/or subsequent map layers. As such, the sensor data associated with current and/or prior map layers may assist the operator in determining whether manual new layers are necessitated. In some other instances, the sensor data associated with current and/or prior map layers, as discussed and alluded to herein, serve to train a machine learning model.

At operation 516, the map generator 146 associated with the processor 144 determines whether the currently received sensed data, at operation 502, was received subsequent to the sensed data associated with the current map layer, from operation 514. In such instances, the sensed data, from operation 502, is accompanied by a timestamp indicating when the information was sensed. As such, the map generator 146 compares timestamps between the currently received sensed data, from operation 502, and the sensed data associated with the current map layer, from operation 514. In other instances, the sensed data has a timestamp associated with it by the time the map generator 146 receives the sensor data (i.e., at operation 502).

If the processor 144 determines that that the newly sensed data was not sensed subsequent to the sensed data associated with the current map layer ("No" at operation 516), the processor 144 will return to operation 502. On the other hand, if the processor 144 determines that newly sensed data was sensed subsequent to the sensed data associated with the current map layer ("Yes" at operation 516), the processor 144 will proceed to operation 518.

At operation 518, the map generator 146, based at least in part on the sensor data received at operation 502, will generate a modification to the current multi-layer material property map data to reflect the newly sensed data. For example, the mobile machine 114 initially senses a state of the work surface 102 of the worksite 104 prior to conducting machine operations. Information (i.e., soil moisture data), provided by the third sensor 118 and collected at a first time with an associated first timestamp, is reported to the computing platform 138 and added to the current multi-layer material property map data. Subsequently, the first machine 106 can be a compactor and perform a compaction machine operation while the first sensor 110 simultaneously collects a variety of material property data, including soil moisture, at a second time, after the first time, with an associated second timestamp. As such, in an example where this sequence does not necessitate a new layer, the map generator 146 will modify the current map layer data according to the timestamp. In some examples, at 518 the map generator 146 will replace previously collected information with more recently collected information, as determined based on, for example, the second time associated with the second timestamp. In some other instances, numerous machine operations can be conducted upon the work surface 102 by the first machine 106 and the second machine 108 where both of the foregoing machines are different and perform different operations upon the same locations of the work surface 102. As such, where these different machines and machine operations do not necessitate a new map layer, the map generator 146 will modify the current map layer based at least in part on the newly sensed information, associated with one or more material properties, as it is received. The processor 144 will proceed from operation 518 to operation 530 and, operation 530 will be discussed in greater detail below.

With continued reference to operation 504 noted above, if the processor 144 determines, based on the sensor data and/or other inputs received at 502, that a new machine operation was conducted ("Yes" at operation 504), the processor 144 will proceed to operation 520. At operation 520, the map generator 146 associated with the processor 144 determines whether the new machine operation, determined in the affirmative at operation 504, has removed material from the work surface 102 of the work site 104. For example, the new machine operation could include the first machine 106 being a cold planer operating upon the work surface 102 to remove an amount material therefrom. In another example, the first machine 106 may comprise a dozer or an excavator, and the operation may include removing at least a portion of the work surface 102 using such machines. It can be appreciated that there are numerous machine operations that can be performed upon the work surface 102 to remove material from the work surface 102 and that the present disclosure is not limited to the examples noted above. Based on a determination that material was not removed ("No" at operation 520), the processor 144 will proceed to operation 522.

At operation 522, the map generator 146 associated with the processor 144 determines whether the new machine operation, determined in the affirmative at operation 504, has added or is adding material to the work surface 102 of the work site 104. For example, the new machine operation could include the first machine 106 being a paving machine operating on the work surface 102 to deposit a mat of paving material thereon. In another example, the first machine 106 may comprise a motor grader, and the new machine operation may include adding, leveling or grading a new layer of soil on the work surface 102. It can be appreciated that there are numerous machine operations that can be performed on the work surface 102 to add material to the work surface 102, and that the present disclosure should not be interpreted as being limited to the examples noted above. If the processor 144 determines that material was not added ("No" at operation 522), the processor 144 will proceed to operation 506 described above. If the processor 144 determines that material was added ("Yes" at operation 522), the processor 144 will proceed to operation 510 described above.

On the other hand, and with continued reference to operation 520, if the processor 144 determines that material is being removed from the work surface 102 during the current operation ("Yes" at operation 520), the processor 144 will proceed to operation 524.

At operation 524, the map generator 146 associated with the processor 144 saves the current map (i.e., sensed data associated with current map and all associated layer(s)) of the existing multi-layer material property map via the second memory 142 associated with the computing platform 138. Operation 524 differs from operation 510 in that operation 510 saves the current map layer to the map while operation 524 saves the entire map in its current state. In some instances, the processor 144 saves the previous current map to the first memory 126 associated with the first machine 106 and/or to the associated memory with the second machine 108 via the network 132. In such examples, the first machine 106 and/or the second machine 108 may receive at least a portion of the current map associated with the existing multi-layer material property map. For example, the first machine 106 can be a compactor and possess limited onboard memory. As such, the at least a portion of the saved current map provided can include historical information useful and/or beneficial to the operations of the compactor. In some further instances, the processor 144 saves the saved current map to the additional computing devices 122. In some other examples, the saved current map is transmitted via the network 132 to the first user interface 128 associated with the first machine 106 as illustrated in FIGS. 2-4. In such examples, the user (i.e., operator) of the first machine 106 may retain access to the saved current map to, for example, compare with a sensor data associated with subsequent map layers. As such, the saved current map may assist the operator in understanding the historical properties of work surface 102, to determine subsequent machine operations, and/or the like. In some other instances, the saved current map, as discussed and alluded to herein, can serve to train a machine learning model.

At operation 526, the map generator 146 associated with the processor 144 determines whether the removed material, affirmed at operation 520, is enough to account for an entire layer of the multi-layer material property map. As such, the map generator 146 evaluates information including cut depth, elevation, removed volume, and the like. For example, a prior layer could measure to a depth of 3 feet and the removed material measures to a depth of 3 feet. As such, the map generator determines that the entire prior layer has been removed.

If the processor 144 determines that the removed material, affirmed at operation 520, is not enough to account for an entire, previous layer ("No" at operation 526), the processor 144 will proceed to operation 516 which can result in a modification to the current map layer at operation 518.

If the processor 144 determines that the removed material, affirmed at operation 520, is enough to account for an entire, previous layer ("Yes" at operation 526), the processor 144 will proceed to operation 528.

In some instances, the amount of material removed, affirmed at operation 520, will fully account for a first preceding layer and at least a portion of a second preceding layer. As such, the processor 144 will move onto operation 528 ("Yes" at operation 526) with respect to the first preceding layer. Additionally, the processor 144 will move onto operation 516 ("No" at operation 526) with respect to the second preceding layer.

At operation 528, the map generator 146 associated with the processor 144 removes current map layer(s) (i.e., previously generated map layer(s) affected by the removal of material) of the existing multi-layer material property map via the second memory 142 associated with the computing platform 138. For example, the first machine can be a cold planer and, via its operation upon the work surface, remove material to a depth. As such, one or more layers and/or at least a portion of a previous map layer of the multi-layer material property map may be affected. For example, the depth of material removed could remove a first preceding layer and a half of a second preceding layer. As such, the map generator 146 associated with the processor 144 will remove a preceding one and one-half layers of the multi-layer material property map. In some instances, the removal of preceding layers can be based at least in part on cut depth, material volume, elevation, and the like. The removal of current map layer(s) may include the removal of full layers and/or partial removal of layers. In other words, a partial removal of a preceding layer can include modifying the layer to reflect the remainder of the layer, as it stands upon the work surface 102, resulting from the removal of material from the new machine operation. At operation 530, the map generator 146 associated with the processor 144 generates at least a portion of the processed map and provides the map, via the network 132, to one or more of the first machine 106, the second machine 108, the mobile machine 114, the aerial machine 116, the additional computing devices 122, and the like. In some instances, the machines may, via the network, provide the processed map amongst themselves and/or the like. For example, the first machine 106 receives the process map while the second machine 108 is inactive and/or disconnected from the network. In such examples, in an effort to reduce bandwidth consumption, the first machine 106 transmits at least a portion of the processed map to the second machine 108 utilizing a short-range communication network. In some examples, the processed map can, as discussed and alluded to herein, be provided to serve to train a machine learning model.

At operation 532, the map generator 146, via the network 132 provides the map. In some instances, the map generator provides, by the second processor 144 and via the network 132, instructions to the first processor 124 disposed at the worksite 104. As such, when the instructions are executed by the first processor 124, the instructions cause the first processor 124 to provide illustrate at least a portion of the multi-layer material property map on the user interface 128. Upon completion of operation 530, the method 500 returns to operation 502.

INDUSTRIAL APPLICABILITY

The present disclosure provides systems and methods for generating a multi-layer material property map associated with information collected from at least a portion of a work surface 102 of a worksite 104. Such systems and methods may be used to achieve better performance for one or more machine operations. Additionally, such systems and methods may be used to improve inefficiencies in machine operations, as well as to accurately determine changes in the material properties of the worksite 104. As noted above with respect to FIG. 5, an example method 500 of generating a multi-layer material property map can include determining first and second density of a compaction operation being conducted on a work surface 102 by a first machine 106. Such an example method 500 can also include determining first and second times of the first machine 106 corresponding to the first and second densities, respectively. Using this information, as well as a location corresponding to such densities and times, a map generator 146 associated with a computing platform 138 determines whether a new layer command 504 has been received, whether the difference between the first and second density has exceeded a threshold, and/or whether a new machine operation has occurred and generates a new map layer or updates an existing layer. The map generator 146 via the computing platform 138 and the network 132 causes a first user interface 128 of the first machine 106 to display at least part of the multi-layer material property map.

By displaying at least part of the multi-layer material property map via the first user interface 128, a user (i.e., operator) of the first machine 106 can consume the density information, location information, and/or other information provided by the multi-layer material property map during one or more paving operations. The operator may utilize such information to modify various machine parameters of the first machine 106, provide a new layer input manually, and/or communicate such information to one or more other machines for changing their respective machine parameters. The computing platform 138 is also configured to provide such information to additional computing devices 122 used by, for example, a foreman at the worksite and/or to a computing device located at, for example, a remote material production plant. Such information can be used by, for example, the foreman to improve the efficiency of various operation activities at the worksite 104. Such information can also be used by the material production plant to more closely manage material properties and/or to optimize the scheduling of haul truck deliveries. Thus, the example systems and methods described above can provide considerable cost savings, provide increased awareness of the conditions and material properties of the worksite 104, and reduce the time and labor required for various paving activities at the worksite 104 among other things that become apparent to one skilled in the art.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A method, comprising:
receiving first information, by a first processor and via a network, determined by a sensor disposed at a worksite, the first information including a first timestamp, an indication of a first location at the worksite, and an indication of a first characteristic of material disposed at the first location;
receiving second information, by the first processor and via the network, the second information including a second timestamp different from the first timestamp, an indication of the first location, and an indication of a second characteristic of material disposed at the first location;
generating, by the first processor, a multi-layer map of the worksite based on the first information and the second information, wherein generating the map comprises:
determining that the first information is indicative of a first operation performed, at the first location, at a first time indicated by the first timestamp;
determining that the second information is indicative of a second operation performed, at the first location, at a second time indicated by the second timestamp after the first time, wherein the second operation is different from the first operation; and
based on determining that the second information is indicative of the second operation different from the first operation:
generating a first layer of the map corresponding to the first operation, and
generating a second layer of the map corresponding to the second operation; and
providing, by the first processor and via the network, instructions to a second processor disposed at the worksite, wherein when executed by the second processor, the instructions cause the second processor to provide an interactive user interface via a display operably connected to the second processor, the user interface illustrating a portion of the map representing the first location, and including at least one of the first information or the second information.

2. The method of claim 1, wherein the sensor is carried by a machine traversing a work surface of the worksite, the sensor providing the first information and the second information.

3. The method of claim 1, wherein the sensor comprises a first sensor carried by a first machine traversing a work surface of the worksite at a first time indicated by the first timestamp; and
the second information is determined by a second sensor carried by a second machine traversing the work surface at a second time indicated by the second timestamp, the second time being after the first time.

4. The method of claim 1, wherein generating the map comprises:
determining that a second time indicated by the second timestamp is after a first time indicated by the first timestamp; and
based on determining that the second time is after the first time, including the second information in the map instead of the first information.

5. The method of claim 1, wherein the portion of the map illustrated by the user interface comprises a first three-dimensional element corresponding to the first layer, and a second three-dimensional element corresponding to the second layer, the user interface further comprising:
a first window including the first information displayed in association with the first three-dimensional element,
a second window including the second information displayed in association with the second three-dimensional element, and
a set of icons configured to receive input via the display, each icon of the set of icons corresponding to a respective operation of a machine carrying the second processor and the display.

6. The method of claim 1, wherein the portion of the map illustrated by the user interface comprises a first three-dimensional element corresponding to the first layer, and a second three-dimensional element corresponding to the second layer, the method further comprising:
receiving, by the second processor and via the display, an input indicative of a selection of the first layer; and
based on the input, causing the display to display, via the user interface and in association with the first layer, information corresponding to the first layer, the information corresponding to the first layer including at least one of:
a time of information collection, an identifier of a machine carrying the first sensor, an amount of machine work performed, a location coordinate, elevation, material density, moisture levels, material composition, material temperature, or suggested actions.

7. The method of claim 1, further comprising generating a third layer of the map based on determining that a difference between a first elevation indicated by the first information and a second elevation indicated by the second information exceeds a threshold value, or that a machine operation corresponding to the first information is different from a machine operation corresponding to the second information.

8. The method of claim 1, wherein generating the map further comprises:
receiving information indicating that a current operation is different from a previous operation;
generating a first layer of the map associated with the previous operation; and
generating a second layer of the map associated with the current operation.

9. A system, comprising:
a first processor;
a sensor disposed at a worksite and in communication with the first processor; and
a memory operably connected to the first processor and storing first instructions which, when executed by the first processor, cause the first processor to:
receive first information, via a network, determined by the sensor, the first information including a first timestamp, an indication of a first location at the worksite, and an indication of a first characteristic of material disposed at the first location;
receive second information, determined by the sensor and via the network, the second information including a second timestamp different from the first timestamp, the indication of the first location, and an indication of a second characteristic of material disposed at the first location;

generate a multi-layer map of the worksite based on the first information and the second information; and provide, via the network, second instructions to a second processor disposed at the worksite, wherein when executed by the second processor, the second instructions cause the second processor to provide an interactive user interface via a display operably connected to the second processor, the user interface configured to illustrate a portion of the map representative of the first location, and including at least one of the first information or the second information, wherein a first machine is configured to receive, via the network, the second instructions, and the first machine further is configured to transmit, via the network, the second instructions to a second machine.

10. The system of claim 9, wherein the sensor comprises a first sensor configured to be carried by a first machine configured to traverse a work surface of the worksite at a first time indicated by the first timestamp, the system further comprising:

a second sensor configured to determine the second information and configured to be carried by a second machine configured to traverse the work surface at a second time indicated by the second timestamp, the second time being after the first time.

11. The system of claim 9, wherein generating the map comprises:

determining that a second time indicated by the second timestamp is after a first time indicated by the first timestamp; and based on determining that the second time is after the first time, include the second information in the map instead of the first information.

12. The system of claim 9, wherein generating the map comprises:

determining, with the first processor, that the first information is indicative of a first operation performed, at the first location, at a first time indicated by the first timestamp;

determining, with the first processor, that the second information is indicative of a second operation performed, at the first location, at a second time indicated by the second timestamp after the first time, wherein the second operation is different from the first operation; and based on determining that the second information is indicative of the second operation different from the first operation:

generating a first layer of the map corresponding to the first operation, and generating a second layer of the map corresponding to the second operation.

13. The system of claim 12, wherein the interactive user interface comprises:

a first three-dimensional element corresponding to the first layer, a second three-dimensional element corresponding to the second layer, a first window including the first information displayed in association with the first three-dimensional element, a second window separate from the first window, the second window including the second information displayed in association with the second three-dimensional element, and a set of icons, the icons configured to receive input via the display, each icon of the set of icons corresponding to a respective operation of a machine carrying the second processor and the display.

14. The system of claim 12, wherein user interface comprises a first three-dimensional element corresponding to the first layer, and a second three-dimensional element corresponding to the second layer, the second instructions further causing the second processor to:

display, based on a received input indicative of a selection of the first layer, and via the display, third information corresponding to the first layer, the third information including at least one of: a time of information collection, an identifier of a machine carrying the first sensor, an amount of machine work performed, a location coordinate, elevation, material density, moisture levels, material composition, material temperature, or suggested actions.

15. The system of claim 12, the first instructions further causing the first processor to generate a third layer of the map based on:

determining a difference between a first elevation indicated by the first information and a second elevation indicated by the second information exceeds a threshold value, or determining that a first machine operation corresponding to the first information is different from a second machine operation corresponding to the second information.

16. A machine system, comprising:

a first machine including;

a frame;

a prime mover supported by the frame;

an implement operably connected to the frame, and moveable relative to the frame to perform at least one operation on a work surface of a worksite at which the machine is disposed, the prime mover being configured to drive the machine along the work surface;

a first processor;

a sensor carried by the frame and operably connected to the first processor; and a memory operably connected to the first processor, the memory storing first instructions which, when executed by the first processor, cause the first processor to:

receive first information, via a network, determined by the sensor, the first information including a first timestamp, an indication of a first location at the worksite, and an indication of a first characteristic of material disposed at the first location;

receive second information, determined by the sensor and via the network, the second information including a second timestamp different from the first timestamp, the indication of the first location, and an indication of a second characteristic of material disposed at the first location;

generate a multi-layer map of the worksite based on the first information and the second information;

provide, via the network, second instructions to a second processor disposed at the worksite, wherein when executed by the second processor, the second instructions cause the second processor to provide an interactive user interface via a display operably connected to the second processor, the user interface configured to illustrate a portion of the map representative of the first location, and including at least one of the first information or the second information; and a second machine disposed at the worksite and configured to perform second operations of the work surface of the worksite, wherein the second operations of the work surface of the worksite are different than the at least one operation of the first machine, the second machine comprising a third processor in communication with the first processor via the network, and a second sensor operably connected to the third processor, the memory storing instructions which, when executed by the first processor, cause the first processor to:

receive a third information, via the network, determined by the second sensor, the third information including information different from the first information and the second information;

generate by the first processor, a multi-layer map of the worksite based on the first information, the second information, and the third information; and provide, via the network, third instructions to the third processor disposed at the worksite, wherein when executed by the third processor, the third instructions cause the third processor to provide an interactive user interface via a display operably connected to the third processor, the user interface configured to illustrate a portion of the map representative of the first location, and including at least one of the first information, the second information, or the third information.

17. The machine system of claim 16, wherein the first machine is a paver configured to lay down asphalt, the first machine further configured to transmit an operational information associated with laying down asphalt.

* * * * *